(12) United States Patent
Myers et al.

(10) Patent No.: US 10,701,555 B1
(45) Date of Patent: Jun. 30, 2020

(54) SYSTEM AND METHOD FOR CONTROL POLICY RETENTION (71) Applicant: BOOZ ALLEN HAMILTON INC., McLean, VA (US)

(72) Inventors: Gary Jason Myers, Fairfax, VA (US); Matthias Welsh, Washington, DC (US); Robert Wayne Knight, Kenmore, WA (US); Timothy Schaefer, Rochester, MN (US)

(73) Assignee: BOOZ ALLEN HAMILTON INC., McLean, VA (US)

(*) Notice: Subject to any disclaimer, the term of this patent is extended or adjusted under 35 U.S.C. 154(b) by 0 days.

(21) Appl. No.: 16/384,146

(22) Filed: Apr. 15, 2019

(51) Int. Cl.
*H04W 12/00* (2009.01)
*H04W 52/02* (2009.01)
*G06K 19/07* (2006.01)
*H04W 4/029* (2018.01)

(52) U.S. Cl.
CPC .... *H04W 12/0027* (2019.01); *G06K 19/0723* (2013.01); *H04W 4/029* (2018.02); *H04W 52/0212* (2013.01); *H04W 52/0229* (2013.01)

(58) Field of Classification Search
CPC ......... H04W 12/0027; H04W 52/0212; H04W 4/029; H04W 52/0229; G06K 19/0723
See application file for complete search history.

(56) References Cited

U.S. PATENT DOCUMENTS

| 10,061,933 | B1 | 8/2018 | Myers | |
|---|---|---|---|---|
| 2010/0235514 | A1 | 9/2010 | Beachem | |
| 2014/0173700 | A1* | 6/2014 | Awan | H04L 63/107 726/4 |
| 2016/0088432 | A1* | 3/2016 | Myers | H04L 63/107 340/5.2 |

FOREIGN PATENT DOCUMENTS

WO 2014063082 A1 4/2014

OTHER PUBLICATIONS

Extended European Search Report for Corresponding European Application No. 20163156.1, dated May 20, 2020, 10 pages.

* cited by examiner

*Primary Examiner* — Meng Li
(74) *Attorney, Agent, or Firm* — Buchanan Ingersoll & Rooney PC (57) ABSTRACT

An exemplary mobile computing device includes an interface configured to wirelessly receive a control policy from an antenna; a processor configured to enforce the received control policy; and memory configured to store the received control policy and retain a last-received control policy for enforcement by the processor when the interface is outside an antenna range to wirelessly receive any control policy.

24 Claims, 4 Drawing Sheets

SYSTEM AND METHOD FOR CONTROL POLICY RETENTION

FIELD

The present disclosure relates to a system and method for controlling the operation and/or execution of certain hardware and software components of a mobile computing device as the device moves between plural operationally secure areas.

BACKGROUND

Existing systems allow an asset be tracked as it moves between different physical locations. These concepts can also be used to enable/disable control of the asset based on its physical location. Radio frequency (RF) technology in the form of RFID tags and RFID readers are used to exchange information with the asset to confirm its physical location. Further, RF technology allows the asset to receive data for controlling its operation while in a specified physical location. The control of the asset in a physical location is dependent on the ability of the asset to maintain communication with an RFID reader within that location. When the location of the asset within a physical location cannot be confirmed, the software and/or hardware components being executed under the control policy being enforced are disabled for security purposes.

SUMMARY

An exemplary method of controlling a mobile computing device is disclosed. The method comprising: receiving wirelessly at the mobile computing device, a first control policy for storage in a memory of the mobile computing device when in range of a first antenna; receiving wirelessly at the mobile computing device, a second control policy for storage in the memory of the mobile computing device when in range of a second antenna; and enforcing the second control policy to control operation of the mobile computing device, when in a powered on state the mobile computing device is outside an antenna range for wirelessly receiving any control policy.

An exemplary mobile computing device is disclosed, comprising: an interface configured to wirelessly receive a control policy from an antenna; a processor configured to enforce the received control policy; and memory configured to store the received control policy and retain a last-received control policy for enforcement by the processor when the interface is outside an antenna range to wirelessly receive any control policy.

These and other features and advantages of particular embodiments of the system and method for location-based security will now be described by way of exemplary embodiments to which they are not limited.

BRIEF DESCRIPTION OF THE DRAWINGS

The scope of the present disclosure is best understood from the following detailed description of exemplary embodiments when read in conjunction with the accompanying drawings. The following figures are included in the drawings.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

This description provides exemplary embodiments only, and is not intended to limit the scope, applicability or configuration of the mobile computing device, system, and method for location-based security of the present disclosure. Rather, the ensuing description of the embodiments will provide those skilled in the art with an enabling description for implementing embodiments of the mobile computing device, system, and method of the present disclosure. Various changes may be made in the function and arrangement of elements without departing from the spirit and scope of the disclosure as set forth in the appended claims. Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

Figure 1:
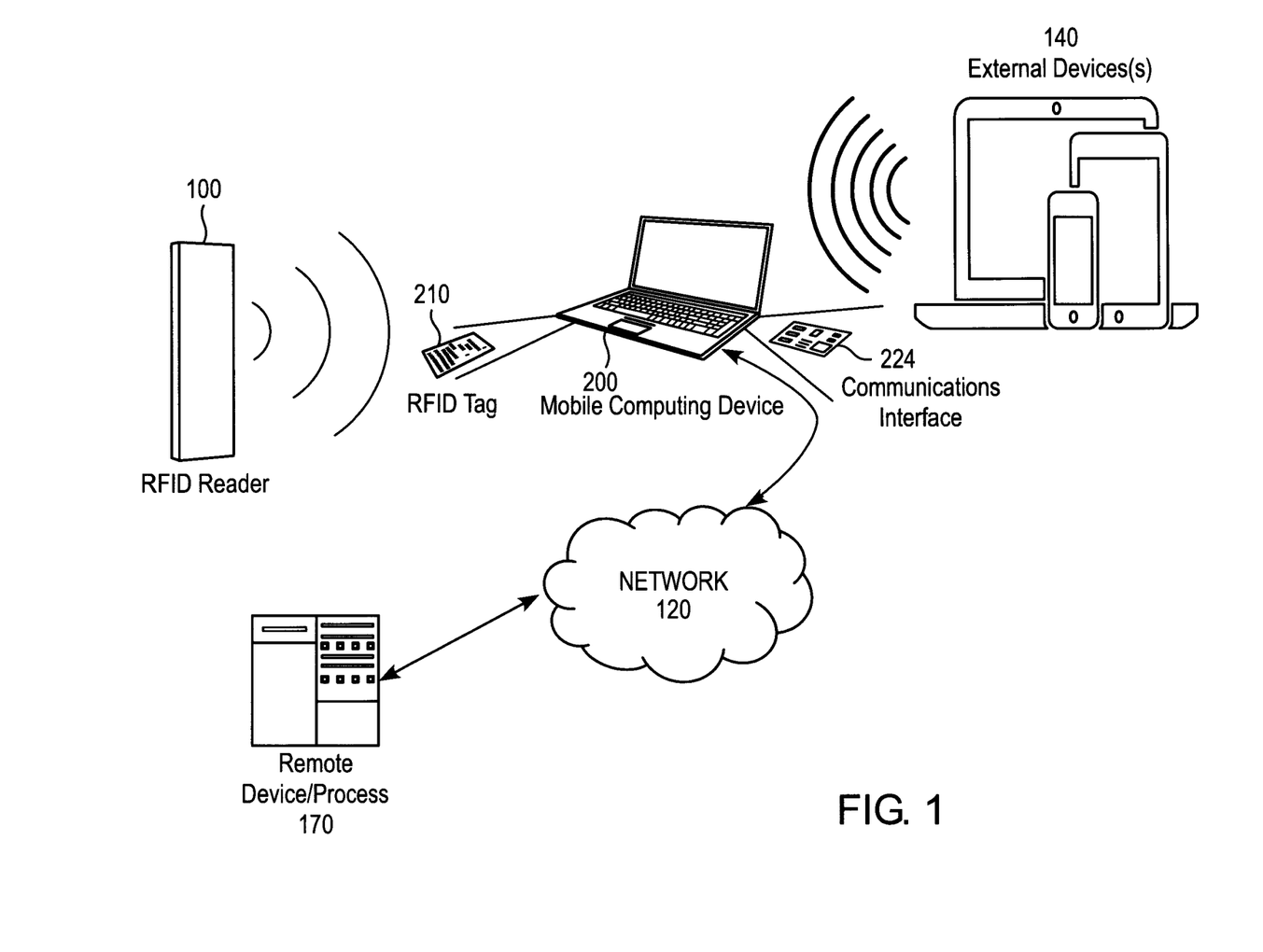
FIG. 1 illustrates a diagram of a system architecture that may be employed in accordance with an exemplary embodiment.
Figure 2:
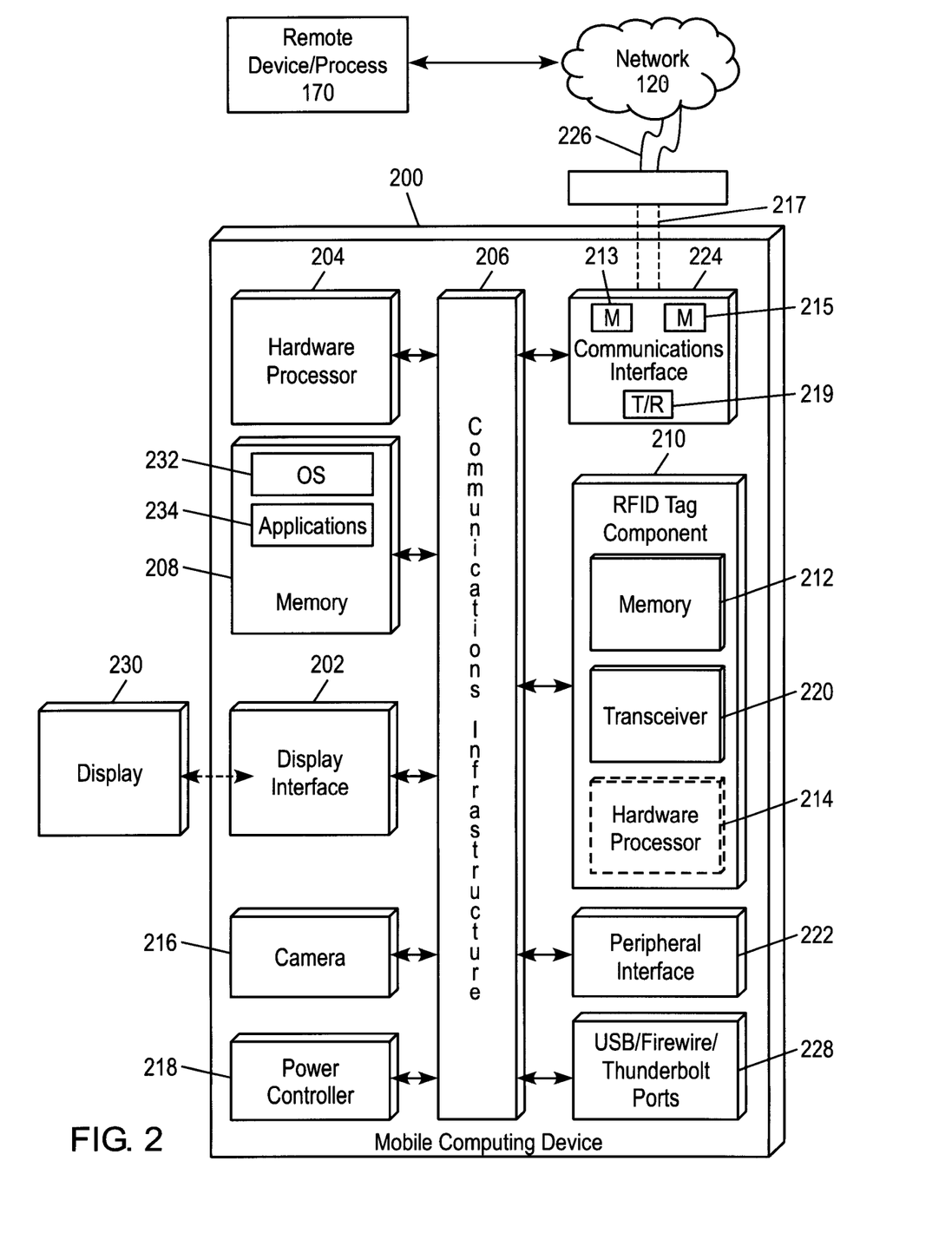
FIG. 2 is a block diagram illustrating the hardware architecture of a mobile computing device in accordance with an exemplary embodiment.

FIGS. 1 and 2 illustrate an exemplary system and apparatus for location-based security, in which a mobile computing device can receive control policies from one or more remote devices based on its physical location in a structure or physical location. The mobile computing device can be connected to receive the control policies over a wired or wireless network when in range to receive a signal from a remote device that stores a control policy. The mobile device can be configured to enforce received control policies whether the mobile computing device is within range of an antenna of an RFID reader 100 or remote device 170 to receive a current new or updated control policy from any remote device.

As shown in FIG. 1, RFID components 210 (e.g., RFID tags) can be removably or fixedly affixed to a mobile computing device 200. The RFID components 210 can comprise microcontrollers (e.g., at least one hardware processor), and the communications infrastructure 206 (e.g., internal and external serial buses) of mobile computing devices 200 exchange location information between the RFID components 210 and the firmware and operating system(s) 232 of the mobile computing device 200. As used herein, a mobile computing device 200 includes at least one hardware processor 204 configured to execute computer-readable programs and an operating system 232 tangibly recorded on a non-transitory computer-readable recording medium ("memory") 208 (e.g., ROM, hard disk drive, optical memory, flash memory, etc.). Examples of a mobile computing device 200 include a laptop, tablet computer, smartphone, or any other suitable device as desired.

FIG. 1 is a block diagram of components of a system for control policy retention using RFID architecture according to an exemplary embodiment of the present disclosure. In FIG. 1, the mobile computing device 200 is shown as having an RFID component 210 affixed thereto. The RFID component 210 may be removably or fixedly affixed to the mobile computing device 200. For example, the RFID component 210 may be comprised within the housing containing the electronic circuitry of the mobile computing device 200. In an exemplary embodiment, the RFID component 210 may have its own hardware processor 214 separate from the hardware processor(s) 204 of the mobile computing device 200. In addition, the RFID component 210 has its own non-transitory memory 212 (e.g., ROM, hard disk drive, optical memory, flash memory, or any other suitable memory device as desired) separate from the memory 208 of the mobile computing device 200, and a transceiver 220. According to an exemplary embodiment, the RFID component 210 can be configure such that it does not have its own hardware processor 214, but does contain the memory 212 and the transceiver 220. As such, the hardware processor(s) 204 perform any necessary processing operations for the RFID component 210. The RFID component 210 may be passive, active, or battery-assisted passive. An active RFID component 210 has an on-board battery and periodically transmits a signal containing a data message (the message can include, e.g., identification information of the RFID component, etc.). A battery-assisted passive RFID component 210 has a small battery on board and is activated when in the presence of an RFID reader 100. A passive RFID component 210 is cheaper and smaller because it has no battery; instead, the RFID component 210 uses the radio energy transmitted by the RFID reader 100. The RFID component 210 contains at least two parts: an integrated circuit for storing and processing information, modulating and demodulating a radio-frequency (RF) signal, collecting DC power from the incident reader signal, and other specialized functions; and a transceiver 220 (e.g., antenna) for receiving and transmitting the signal. In an exemplary embodiment, the transceiver 220 can include two antennas in different polarizations such as linear and circular or horizontal and vertical. A single antenna can also be used. The RFID component 210 can operate, for example, in a frequency range between 860 and 960 MHz. The sensitivity of the antenna is important to the operation of the RFID component 210, and a minimum receive gain of the antenna greater than −2 dB should be maintained to ensure proper operation. In an exemplary embodiment, the antenna provides a roughly omni-directional radiation pattern. Due to regional banding of the ~900 MHz ISM frequency space, the antenna(s) may be regionally designed. For instance, the North American ISM band is 902-928 MHz. With a transmitter at 28 dBm complying with FCC and UHF RFID Gen2 Specifications, this should yield a free space range of approximately 20 meters.

The RFID component 210 information (i.e. tag information) is stored in a non-volatile memory, e.g., memory 212. The RFID component 210 includes either fixed or programmable logic for processing the transmission and sensor data, respectively. In an exemplary embodiment, the RFID component 210 includes an Impinj MonzaX-8K Dura RFID integrated circuit or similar integrated circuit. FIG. 1 illustrates only one RFID reader 100 and RFID component 210 for clarity of illustration. However, it is to be understood that several RFID readers 100 may be equipped in a room or other area to which the mobile computing device may be carried. An RFID reader 100 transmits a radio signal, which may be encoded, to interrogate the RFID component 210. The RFID component 210 receives the message from the RFID reader 100 and then responds with its identification information. An exemplary RFID reader 100 contains a non-transitory memory device that can store the proximity signal (which can include the location data and/or a control policy), a hardware processor (e.g., CPU), and a transceiver.

The RFID reader(s) 100 can send a proximity signal (e.g., location-related information includes, for example, geographic coordinates, configured zones, and/or proximity information)) to the RFID component 210 embedded within or affixed to the mobile computing device 200, indicating the defined physical location of the RFID reader(s) 100 and/or the mobile computing device 200. The location information can be transmitted to the RFID component 210 while the mobile computing device 200 is in both the powered-on and powered-off states. The message stored in the RFID component's memory 212 is accessed by the hardware processor 214 of the RFID component 210. The hardware processor 214 serves three functions: 1) processes the location information provided by the RFID component 210 against corresponding control or management policies to determine the appropriate power state for the mobile computing device 200; 2) communicate with the power interface/controller 218 of the mobile computing device 200 to manage power states (e.g., force power off, enable power on, and disable power on); and 3) pass the location information to the mobile computing device's serial buses 206. In an exemplary embodiment, the RFID reader 100 can adjust its transmission frequency to avoid standard frequencies.

FIG. 1 also shows the mobile computing device 200 having a communications interface 224, which allows the mobile computing device 200 to connect to a remote device/process 170 via communication/data network 120. The communications interface 224 can include a combination of software and hardware components and be implemented as a network interface card (NIC), network adapter, LAN adapter, a modem, a communications port, a PCMCIA slot and card or any other suitable component as desired. As a network interface the communications interface 224 can include an integrated circuit chip or a chipset including one or more dedicated processors 213, dedicated memory 215, one or more ports or sockets for wired connection to a network cable 217, and a transceiver 219 allowing for wireless network communication. The one or more ports or sockets for wired connection to a network cable 217 can provide for Ethernet communication. The transceiver 219 can provide for wirelessly sending and receiving information and data through infrared (IR) wireless communication, radio frequency (RF) signals, Bluetooth, ZigBee, Wi-Fi, Wi-Max, cellular network include 3G, 4G, and 5G standards, global positioning system (GPS), a satellite communication, and any other suitable wireless communication protocols and/or standards for communicating a control policy as described herein. The communications interface 224 can be configured to support desired communication data rates, network addressing, and the network protocol, such as 10, 100, or 1000 Mbits/s and from 1 Gbit/s up to 160 Gbit/s. The communications interface 224 can be configured to use any of polling and interrupt techniques for determining when data is to be transferred to peripheral or remote devices and use remote and/or dedicated memory for transmitting and receiving data packets over the network.

The communications interface can include an antenna which allows for wireless communication between 2.4 to 5.5

GHz at a frequency range of 20 kHz to 30 GHz. The antenna can be omnidirectional, semi-directional, or directional dependent with a distance range of up to 160 ft depending upon the communication protocol and/or area being monitored.

FIG. 2 is a block diagram illustrating a mobile computing device 200 architecture in accordance with an exemplary embodiment. As shown in FIG. 2 the exemplary computing device 200 is configured for communication of a control policy via RFID and wired or wireless communication technology. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A hardware processor device as discussed herein may be a single hardware processor, a plurality of hardware processors, or combinations thereof. Hardware processor devices may have one or more processor "cores." The terms "computer program medium," "non-transitory computer readable medium," and "computer usable medium" as discussed herein are used to generally refer to tangible media such as a memory device 208, a memory device 212, and a memory device that can be provided in the RFID reader 100.

Various embodiments of the present disclosure are described in terms of this exemplary mobile computing device 200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The hardware processors 204, 214 and the processor or the RFID reader may be special purpose or general purpose processor devices. The hardware processor device 204 may be connected to a communication infrastructure 206 via the communications interface 224, such as a bus, message queue, network, multi-core message-passing scheme, etc. The network may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any other network disclosed herein, or combination thereof. Other suitable network types and configurations will be apparent to persons having skill in the relevant art. The mobile computing device 200 may also include a memory 208 (e.g., random access memory, read-only memory, etc.), and may also include a memory 212. The memory 208 and the memory 212 may be read from and/or written to in a well-known manner. In an embodiment, the memory 208 and the memory 212 (and memory 302) may be non-transitory computer readable recording media.

Data stored in the mobile computing device 200 (e.g., in the memory 208 and the memory 212) may be stored on any type of suitable computer readable media, such as optical storage (e.g., a compact disc, digital versatile disc, Blu-ray disc, etc.), magnetic tape storage (e.g., a hard disk drive), or solid-state drive. An operating system 232, one or more applications 234, and one or more hypervisors 236 can be stored in the memory 208.

In an exemplary embodiment, the data may be configured in any type of suitable database configuration, such as a relational database, a structured query language (SQL) database, a distributed database, an object database, etc. Suitable configurations and storage types will be apparent to persons having skill in the relevant art.

The communications interface 224 may be configured to allow software and data to be transferred between the mobile computing device 200 and external devices. Software and data transferred via the communications interface 224 may be in the form of signals, which may be electronic, electromagnetic, optical, or other signals as will be apparent to persons having skill in the relevant art. The signals may travel via a communications path 226, which may be configured to carry the signals and may be implemented using a wired or wireless connection such as a wire, cable, fiber optics, a phone line, a cellular phone link, a radio frequency link, or any other wired or wireless technology discussed herein or otherwise suitable for data communication.

Computer program medium and computer usable medium may refer to memories, such as the memory 208 and the memory 212, which may be memory semiconductors (e.g., DRAMs, etc.). These computer program products may be means for providing software to the mobile computing device 200. Computer programs (e.g., computer control logic) may be stored in the memory 208 and/or the memory 212. Computer programs may also be received via the communications interface 224. Such computer programs, when executed, may enable mobile computing device 200 to implement the present methods as discussed herein. In particular, the computer programs, when executed, may enable hardware processor device 204 to implement the methods discussed herein. Accordingly, such computer programs may represent controllers of the mobile computing device 200. Where the present disclosure is implemented using software, the software may be stored in a computer program product or non-transitory computer readable medium and loaded into the mobile computing device 200 using a removable storage drive or communications interface 224.

The mobile computing device 200 may also include various hardware devices, such as a camera 216, a microphone (not shown), a power interface/controller 218 peripheral interface 222, and input/output ports 228 such as USB, firewire, thunderbolt ports, etc. As described in greater detail below, the RFID component 210 may be located within and integrated with the mobile computing device 200, or the RFID component 210 can be external to the mobile computing device 200 and connected thereto by a signal transmission means such as a wire(s), wireless communications, etc.

Lastly, the mobile computing device 200 may also include a display interface 202 that outputs display signals to a display unit 230, e.g., LCD screen, plasma screen, LED screen, DLP screen, CRT screen, etc.

According to an exemplary embodiment, the location information provided through the mobile computing device's buses 206 can be integrated with either a hypervisor 236 or a native operating system 232 using a device driver.

Hypervisors 236 allow for the control of hardware of the mobile computing device 200 and guest virtual machines. Location-based security can be integrated in the hypervisor control domain directly or be installed as a guest virtual machine that interfaces with the hypervisor control domain.

Location-based security can be configured with rules to manage the hypervisor control domain using the desired automated response associated with various defined locations. Virtual machines, network interface cards, device power, USB ports, cameras, microphones, and other device hardware can be enabled or disabled based on defined policy rules.

The hypervisor 236 is configured to further distribute the location information to guest virtual machines running on the host machine. The hypervisor is used to isolate the user VMs from hardware as defined in the control policy, ensure a secure networking environment and cryptographically isolate VMs from each other.

The operating system(s) 232 of the mobile computing device 200 can receive RFID-based or network-based location information from either the serial buses 206 directly if running as a native operating system 232, or as a pass-through from the hypervisor 236 if running on a guest virtual machine. The location-based security techniques of the present disclosure integrate with the operating system(s) 232 to control access to device hardware and device power states using the defined policy rules. Access to one or more applications 234 and one or more files stored or running on the operating system(s) 232 are also enabled or disabled using the device management functionality of the location-based security system and method of the present disclosure. A file can be, for example, a document, picture, video, database records, etc.

Virtual systems management (VSM) can be used to dynamically manage hardware available to the User OS (USB devices, webcam, microphone, Bluetooth, etc.) and provide secure networking based on the policy issued over RFID or a communication network.

As shown in FIG. 2, the mobile computing device 200 includes the memory device 208 having computer-readable instructions tangibly recorded thereon. The mobile computing device 200 also includes a hardware processor 204 configured to execute the computer-readable instructions recorded on the memory device 208. The mobile computing device 200 can also include an RFID component 210 that includes a transceiver 220 (e.g., an antenna) configured to receive a proximity signal from at least one RFID reader 100 when the RFID component 210 is within a predetermined range (e.g., within a couple feet or meters) of the at least one RFID reader 100. The predetermined range can be configured based on (1) the processing and/or telecommunication capabilities of the mobile computing device 200, RFID component 210 and/or RFID reader(s) 100, and/or (2) based on selectable distances (e.g., 10 feet, 20 feet, 30 feet) for specific control objectives, and/or (3) location restrictions such as the physical size of a room, building, or segment of a building (e.g., the second floor of the building) The mobile computing device 200 can also include a memory device 212 configured to store the proximity signal. In an exemplary embodiment, the hardware processor 204 is configured to, upon executing the instructions recorded on the memory device 208, control at least one operation of the mobile computing device 200 in accordance with the proximity signal received by the transceiver 220 of the RFID component 210 from the at least one RFID reader 100.

As shown in FIG. 2, the mobile computing device 200 can also include a communications interface 224, which when configured as a network interface can include a transceiver 219 for receiving a control signal from a remote process/device on the network based on a physical location of the device on the network. According to an exemplary embodiment, the mobile computing device 200 can be configured to execute a discovery protocol to determine its physical location on the network, and send the discovery data to a network server and/or the remote process/device 170 on the network. Based on the discovery data, the remote process/device 170 can send a control policy to the mobile computing device 200, which controls its hardware and/or software functions based on its physical location on the network, which corresponds to a location in an area of operation such as a physical structure or geographic location.

In an exemplary embodiment, the hardware processor 204 is configured to control at least one of: (1) at least one hardware component (e.g., memory device 208, display interface 202, camera 216, microphone, peripheral interface 222, communications interface 224, ports 228, etc.) of the mobile computing device 200; (2) at least one operating system 232 recorded on the memory device 208; (3) at least one hypervisor 236 recorded on the memory device 208; and (4) at least one application program 234 executable on the mobile computing device 200; and (5) the power interface/controller 218 for controlling power on/off states of the mobile computing device 200.

In an exemplary embodiment, the proximity signal communicated by the RFID reader 100 includes a control policy including identifications of operations of the mobile computing device 200 that are performable (e.g., by the mobile computing device 200). For example, according to the control policy, the hardware processor 204 is configured to enable or disable access to at least one of an executable application 234 stored in the memory device 208, a file stored in the memory device 208, at least one operating system 232 of the mobile computing device 200, and a peripheral hardware component (e.g., external hard drive, server, external disk drive, etc.) with which the mobile computing device 200 is configured to communicate. That is, when the mobile computing device 200 is within a certain range of the RFID reader 100, the RFID reader 100 sends the proximity signal, which includes the control policy, to the RFID component 210. Because the control policy identifies which operations, devices, files, or applications can be accessed and/or used by the mobile computing device 200, the hardware processor 204 is able to control the operations and/or access to devices, files, applications, etc. of the mobile computing device 200 in accordance with the control policy that was received. In an exemplary embodiment, a server can store multiple control policies for individual RFID readers 100 and/or mobile computing devices 200, and each control policy can be sent to the appropriate RFID reader 100 to which the control policy applies. The control policies can be updated on the server, and the updated control policies can be pushed by the server to the appropriate RFID readers 100. When an RFID reader 100 receives its intended control policy, it is saved in the memory of the RFID reader 100 where it can subsequently be transmitted to the RFID component 210 of the mobile computing device 200.

According to an exemplary embodiment, the proximity signal includes location-related data indicating a current physical location of at least one of the RFID component 210 and the at least one RFID reader 100. The location-related data can identify the reader that transmitted the proximity signal (by name, MAC ID, serial number, code, room name, etc.). The location-related data can also identify a defined zone (i.e. an area of space in which the mobile computing device 200 is located). The location-related data can be formatted in suitable units as desired, such as in geographical coordinates, for example.

In an exemplary embodiment, the memory device 208 has recorded thereon a control policy for the mobile computing device 200, the control policy including identifications of operations of the mobile computing device 200 which are performable based on the physical location of the mobile computing device 200. The hardware processor 204 is configured to compare the location-related data with the control policy, and determine which operations of the mobile computing device 200 are permitted to be performed based on the comparison. The control policy can be downloaded and/or received from an RFID reader 100 or a remote device 170 over a wired or wireless network. According to an exemplary embodiment, the control policy can be a default policy stored in secure memory that allows the mobile computing device to enter a pre-configured state.

In an exemplary embodiment, based on the comparison of the location-related data with the control policy, the hardware processor 204 is configured to control a power state of the mobile computing device 200. Exemplary power states include: power off, power on, sleep mode, hibernate mode, or any other suitable power state as desired. The hardware processor 204 can generate control signals that are sent to the power interface/controller 218 to maintain or modify a current power state when the hardware processor 204 receives and enforces a new control policy. In addition, when no valid control policy is stored in memory 208, 212 and when the communication interface 224 or RFID component 210 is outside antenna range to wirelessly receive any control policy, the hardware processor 204 can control to the power interface/controller 218 to be powered off or enter a power off state or a default pre-configured state.

In an exemplary embodiment, based on the comparison of the location-related data with the control policy, the hardware processor 204 is configured to control access to at least one hardware component (e.g., memory device 208, display interface 202, camera 216, microphone, peripheral interface 222, communications interface 224, ports 228, etc.) of the mobile computing device 200.

Based on the comparison of the location-related data with the control policy, the hardware processor 204 can be configured to enable or disable access to at least one of an executable application 234 stored in the memory device 208, a file stored in the memory device 208, at least one operating system 232 of the mobile computing device 200, and a peripheral hardware component with which the mobile computing device 200 is configured to communicate.

The transceiver 220 of the RFID component 210 can be configured to receive an update signal from at least one RFID reader 100, the update signal containing an update to at least one of the identifications included in the control policy recorded on the memory device 208. The hardware processor 204 can be configured to update the control policy recorded in the memory device 208 in accordance with the update contained in the update signal.

According to an exemplary embodiment, the hardware processor 204 can be configured with program code to evaluate a new or updated control policy received by the communication interface 204 or RFID component 210 for validity. Upon power-up, the processor 204 can initiate a boot sequence during which a boot control program is executed. A first bootloader is loaded which controls the hardware processor 204 to retrieve the control policy from memory 208 and evaluate it for expired, corrupted or malicious code, data, or instructions. The evaluation includes analyzing various properties of the control policy or information/data contained therein including, for example, information identifying a physical location for enforcement of the control policy, a date or date range of enforcement, a user device identifier against which the policy is to be enforced, formatting of the control policy, syntax and/or various other attributes or parameters of the control policy as desired. The information and/or properties of the control policy can be compared with verified values to determine whether the control policy has expired, is corrupted, or is malicious (e.g., execution of the control policy may result in an adverse condition or event in the mobile computing device or network).

If the evaluation results in determining that the control policy stored in memory is valid, the hardware processor 208 under the control of the first bootloader can determine whether the valid control policy allows boot up of the mobile computing device. If the boot up of the mobile computing device is allowed, the first bootloader controls the hardware processor 208 to initiate an OS bootloader 210. On the other hand, if the hardware processor 208 determines that boot up of the mobile computing 200 is not allowed, the first bootloader does not initiate the OS bootloader and controls the hardware processor 208 to send a control signal to the power interface/controller 218 to interrupt power and force a power off of the mobile computing device 200.

If the evaluation results in a determination that the stored control policy is not valid, the hardware processor 208 can be configured to execute a disk wipe in which the encryption keys stored in memory are dumped and all content on stored on the disk outside of code necessary for powering on the computer is removed. Execution of the disk wipe is determined based on whether a threshold number of invalid control policies (e.g., wipe threshold) have been stored in memory. If the wipe threshold is not been exceeded, then hardware processor 208 can control the power interface/controller 218 to enter a power off state or the processor can enter a pre-configured or default state based on a default control policy stored in trusted memory.

In an exemplary embodiment, at least one of the control policy and the proximity signal are encrypted. Thus, the location data received from the RFID reader 100 can be encrypted. For example, the control policy and/or the proximity signal can be encrypted using an AES-256 GCM algorithm and signed with an ECDSA Curve P-385 signature or with a similar encryption scheme. In an exemplary embodiment, certificates for the ECDSA process are distributed as part of the system configuration and are assigned based on organizational region. Policy signatures can be generated, for example, on the message bytes 0 to 927. In an exemplary embodiment, encryption is performed on the entirety of the message bytes 0 to 1024 after the signature is generated. Pre-distributed key material unique to each RFID tag is stored in the device TPM and on a server. The key material is hashed with a NONCE that is part of the RFID transmission to generate individual session keys for each of the written policies. In an exemplary embodiment, a single policy can be used for both the UEFI/firmware of the mobile computing device 200 and operating system 232 of the mobile computing device 200, so both have cryptographic capabilities capable of decrypting the entire message and verifying the signature. Key storage can be handled in a TPM 2.0 capable TPM. In an exemplary embodiment, all messages of the RFID component 210 except for the NONCE(s) are encrypted, for example using the scheme above.

The messages used in the present disclosure can be stored on the memory device 212 of the RFID component 210. In an exemplary embodiment, the memory device 212 is 1,024 bytes in storage size, and stores the control policy along with a CRC16, ECDS curve P-384 generated signature and a 512 bit random NONCE unique to that configuration.

According to the exemplary embodiment shown in FIG. 1, the at least one RFID reader 100 is configured to communicate wirelessly with the RFID component 210 of the mobile computing device 200 and transmit the proximity signal to the RFID component 210 of the mobile computing device 200 when the RFID component 210 is within the predetermined range of the RFID reader 100. In an exemplary embodiment, at least one server is configured to transmit the update signal to the RFID reader 100 for updating the control policy recorded on the memory device 208 when the mobile computing device 200 is in communicative range with the RFID reader 100. The system also includes a communication interface 224 which is configured for wired (e.g., Ethernet) or wireless communication (e.g., Wi-Fi) with a network 120 for receiving a control policy from a remote device/process on the network 170 based on a node location of the mobile computing device within the network. The node location corresponding to a location within a secured area.

The memory devices 208, 212 have recorded thereon computer-readable instructions and a control policy for the mobile computing device 200, the control policy including identifications of operations of the mobile computing device 200 which are performable based on the location-related data of the received proximity signal.

The RFID component 210 includes a hardware processor 214 configured to execute computer-readable instructions recorded on the memory device 212. The hardware processor 214 is configured to compare the location-related data with the control policy, determine which operations of the mobile computing device 200 are permitted to be performed based on the comparison, and generate an operation signal identifying the operations of the mobile computing device 200 which are determined to be performable.

The RFID component 210 is configured to transmit the operation signal to the hardware processor 204 of the mobile computing device 200, and the hardware processor 204 is configured to control at least one operation of the mobile computing device 200 in accordance with the operation signal received from the transceiver 220 of the RFID component 210. According to another embodiment, the communications interface 224 can be configured to store a received control policy in memory 208 for execution or enforcement by the hardware processor 204. The hardware processor 204 can compare the location-related data of the mobile computing device 200 with the control policy, determine which operations of the mobile computing device 200 are permitted to be performed based on the comparison, and generate an operation signal identifying the operations of the mobile computing device 200 which are determined to be performable.

Based on the operation signal received from the transceiver 220 of the RFID component 210, the hardware processor 204 can be configured to control a power state of the mobile computing device 200 through the power interface/controller 218; and configured to control access to at least one hardware component (e.g., memory device 208, display interface 202, camera 216, power interface/controller 218, peripheral interface 222, communications interface 224, ports 228, etc.) of the mobile computing device 200.

In an exemplary embodiment, based on the operation signal received from the transceiver 220 of the RFID component 210, the hardware processor 204 and configured to enable or disable access to at least one of an executable application 234 stored in the memory device 208, a file stored in the memory device 208, at least one operating system 232 of the mobile computing device 200, and a peripheral hardware component with which the mobile computing device 200 is configured to communicate.

In an exemplary embodiment, the transceiver 220 of the RFID component 210 is configured to receive an update signal from at least one RFID reader 100, the update signal containing an update to at least one of the identifications included in the control policy recorded in the memory device 212. The hardware processor 214 can be configured to update the control policy recorded in the memory device 212 in accordance with the update contained in the update signal. According to an exemplary embodiment, the communications interface 224 can be configured to receive the update signal from a remote device/process 170 on the network 120 and store the received signal in the memory device 208. The hardware processor 204 can be configured to update the control policy recorded in the memory device 208 in accordance with the update contained in the update signal.

In an exemplary embodiment shown in FIG. 1, a system includes, for example, the mobile computing device 200, at least one RFID reader 100, and the RFID component 210. The at least one RFID reader 100 is configured to communicate wirelessly with the RFID component 210 of the mobile computing device 200 and transmit the proximity signal to the RFID component 210 of the mobile computing device 200 when the RFID component 210 is within the predetermined range. At least one server is configured to transmit the update signal to the at least one RFID reader 100 for updating the control policy recorded in the memory device 208 when the mobile computing device 200 is in communicative range with the at least one RFID reader 100.

According to an exemplary embodiment, a non-transitory computer-readable storage medium (e.g., memory 208) stores instructions which, when executed by the hardware processor 204 of the mobile computing device 200, cause the hardware processor 204 to perform a method for controlling at least one operation of the mobile computing device 200. The method includes receiving a proximity signal from the transceiver 220 of the RFID component 210 communicatively connected to the mobile computing device 200, the transceiver 220 receiving the proximity signal when the RFID component 210 is within a predetermined range of at least one RFID reader 100. Communicatively connected means, for example, that the mobile computing device 200 and RFID component 210 can communicate with each other by any type of communication means, for example, via a signal transmission means such as a wire, bus, etc. or wirelessly via Wi-Fi, Bluetooth, NFC, etc. The method can also include executing, by the hardware processor 204 of the mobile computing device 200, the instructions stored on the non-transitory computer-readable storage medium (memory 208) of the mobile computing device 200, the executed instructions controlling the at least one operation of the mobile computing device 200 in accordance with the proximity signal received by the transceiver 220 of the RFID component 210 from the at least one RFID reader 100. Through storage of the proximity signal in memory device 212, the hardware processor 204 can be configured to maintain enforcement of a current control policy even if the mobile computing device 200 moves out of range of an antenna transmitting the proximity signal associated with the current control policy. The hardware processor 204 can execute the current control policy until a new control policy and/or proximity signal not associated with the current control policy is received.

In an exemplary embodiment, a non-transitory computer-readable storage medium (e.g., memory 212) stores instructions which, when executed by the hardware processor 214 located in the RFID component 210 communicatively connected to the mobile computing device 200, cause the hardware processor 214 to perform a method for controlling at least one operation of the mobile computing device 200. The method includes receiving, by the transceiver 220 of the RFID component 210, a proximity signal when the RFID component 210 is within a predetermined range of at least one RFID reader 100. The method can also include storing the proximity signal in the non-transitory computer-readable storage medium (memory 212) of the RFID component 210, the non-transitory computer-readable storage medium of the RFID component 210 having a control policy for the mobile computing device 200. The control policy including, for example, identifications of operations of the mobile computing device 200 which are performable based on the received proximity signal. As already discussed, the hardware processor 214 can execute a current control policy even if the mobile computing device 200 is out of range of an antenna transmitting the proximity signal associated with the current control policy. Execution of the current control policy is maintained until a new control policy and/or proximity signal not associated with the current control policy is received and stored in the memory device 212. The method can also include comparing the proximity signal to the control policy, determining which operations of the mobile computing device 200 are permitted to be performed based on the comparison, and generating an operation signal identifying the operations of the mobile computing device 200 which are determined to be performable. The method can also include transmitting the operation signal, to a hardware processor 204 of the mobile computing device 200, to control at least one operation of the mobile computing device 200 in accordance with the operation signal transmitted to the mobile computing device 200.

The above-described method can perform any of the operations of the mobile computing device 100 and the RFID component 210 as described herein. Furthermore, the above-described non-transitory computer-readable storage medium of the mobile computing device 200 and RFID component 210 can store instructions which cause the respective hardware processor(s) of those devices to respectively perform the operative functions of the mobile computing device 200 and RFID component as described herein.

Figure 3:
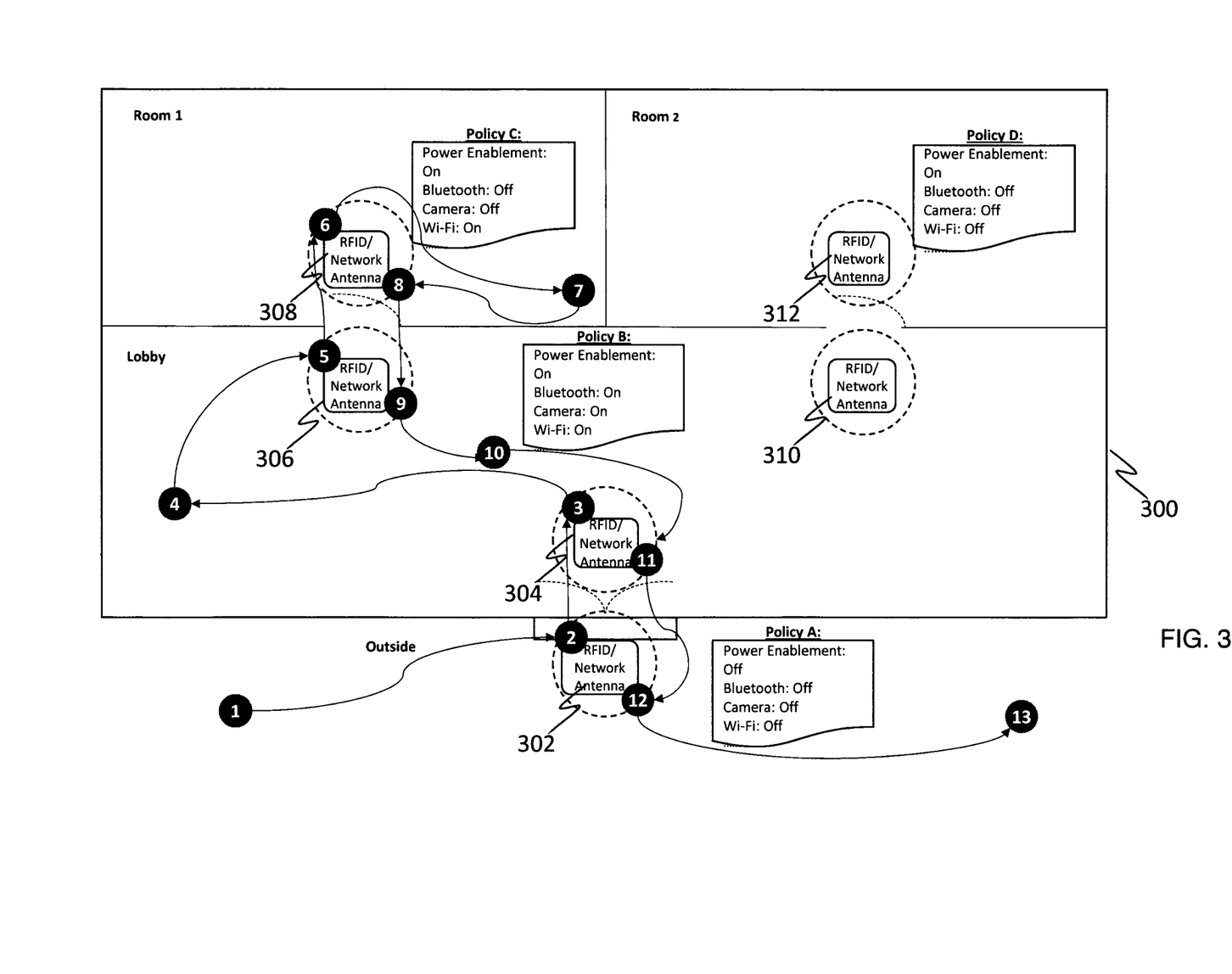
FIG. 3 is a flow diagram illustrating an exemplary scenario for retaining a control policy according to an exemplary embodiment.

The present disclosure provides that different operations can be performed with the mobile computing device 200 based on the mobile computing device's 200 presence in different areas having different security designations. FIG. 3 is a diagram illustrating an exemplary scenarios according to the present disclosure in which the mobile computing device 200 (abbreviated as "host") is outside an allowed area, enters a secured allowed area, moves between different controlled locations in the secured allowed area while being within and outside of the range of an antenna of a remote device, and leaves the allowed area. For each of these areas, the RFID reader 100 (top block), the RFID component 210 (middle block) and the hardware processor 204 of the mobile computing device 200 (lower block) executing the above-described software dedicated to interfacing with the RFID component 210.

According to an exemplary scenario, the secured area can be a building 300 with plural rooms and plural associated RFID or remote devices 302-312. Prior to entering the secured area the mobile computing device 200 is in a power off state and has no control policy stored in memory 212 or a default control policy stored in memory 208 (1). According to an exemplary embodiment, when no valid control policy is stored in memory and when the mobile computing device is outside antenna range to wirelessly receive a control policy, the hardware processor 204 can be configured to control the power interface/controller 218 to enter a powered off state or a default pre-configured state. Under this condition, the default control policy is enforceable by hardware processor 204. Prior to entering the building 300, the mobile computing device 200 passes within antenna range of an RFID reader 402 located just outside the entrance 304 (2). The mobile computing device 200 remains in the powered off state and the RFID Reader 302 writes a control policy A to the memory 212 of RFID component 210. The processor(s) 204, 214 will enforce control policy A. Under control policy A, the power on state of the mobile computing device 200 is disabled as well as all software applications 234 and hardware components including memory 208. That is, the hardware processor 204 controls the power interface/controller 218 to maintain a powered off state.

Once inside the building, the mobile computing device 200 while still in a powered off state may pass within antenna range of an RFID reader 304, which writes a control policy B to the memory 212 of the RFID component 210 (3). Under control policy B, the power on state of the mobile computing device 200 is enabled as well as at least a subset of software applications 234 stored in memory 208 and hardware components. As a result, the mobile computing device 200 can be powered on by the user. Upon power-up, the transceiver of the RFID component 210 listens (e.g., monitors the area for signals) for an in range antenna or transmitter. When a transmitter is detected and the mobile computing device 200 is within antenna range, an updated control policy can be downloaded to memory 212 of the RFID component 210. The hardware processor 204, 214 enforces the updated control policy to control the operation of the mobile computing device 200 according to the current location. As the user moves to other areas in the building the mobile computing device 200 may pass outside the antenna range of the RFID reader 304 (4). This means that the mobile computing device 200 will no longer receive a proximity signal B transmitted by the RFID reader 304. Despite the mobile computing device 200 being beyond antenna range, the RFID component 210 will retain control policy B and proximity signal B in memory 212 and enforcement of control policy B by hardware processor(s) 204, 214 will be maintained.

As the user moves toward a first room of the building, the mobile computing device 204 passes within antenna range of an RFID reader 306 (5). The RFID reader 306 writes control policy B and the proximity signal B to the memory 212 of the RFID component 210. Because control policy B is currently being enforced by the processor(s) 204, 214, no change in the configuration or operation of the mobile computing device 200 is made. If the user moves into the first room of the building, the mobile computing device 200 remains in the power on state and passes within antenna range of an RFID reader 308 (6). The RFID reader 308 writes a control Policy C and proximity signal C to the memory 212 of the RFID component 210 and the control Policy C will be enforced by the processor(s) 204, 214. Under control Policy C, for example, the power on state of the mobile computing device is enabled along with software and hardware components associated with Wi-Fi, control Policy C disable the software and hardware components associated with Bluetooth and a camera. If the user moves within the first room such that the mobile computing device 200 is outside antenna range of the RFID reader 308 (7), the memory 212 of the RFID component 210 will retain the control policy C and proximity signal C such that the current configuration and operation of the mobile computing device will be maintained.

If through movement of the user within the first room, the mobile computing device 200 again passes within antenna range of RFID reader 308 while in a power on state, the RFID reader 308 will write the control policy C and proximity signal C to the memory 212 of the RFID component 210 (8). Because control policy C is currently being enforced by the processor(s) 204, 214, no change in the configuration or operation of the mobile computing device 200 is made. If the user leaves the first room and passes within antenna range of an RFID reader 306 while the mobile computing device is powered on, the RFID reader 306 will write the control policy B and proximity signal B to the memory 212 of the RFID component 210 (9). Control Policy B will then be enforced by the processor(s) 204, 214. If the user next moves outside of the antenna range of RFID reader 306, control Policy B and proximity signal B will be retained in memory 212 and the current operation of the mobile computing device 200 will be maintained (10).

As the user continues movement through the building and passes within antenna range of RFID reader 304, the control Policy B and proximity signal B will be written to the memory 212 of the RFID component 210 (11). Because control policy B is currently being enforced by the processor(s) 204, 214, no change in the configuration or operation of the mobile computing device 200 is made. If the user decides to exit the building and passes within antenna range of RFID reader 302 while the mobile computing device 200 is powered on, the control Policy A and proximity signal A will be written to the memory 212 of the RFID component (12). The processor(s) 204, 214 will enforce control policy A. Control Policy A and proximity signal A will be retained and enforced by the processor(s) 204, 214 should the mobile computing device 200 move outside of antenna range of the RFID reader 302 (13).

If the mobile computing device 200 is powered off, control policy A will be enforced upon the next power up. Upon power-up, the processor 204 will enforce control policy A, and at the same time the RFID component 210 will monitor the area for in range antennas or transmitters so that a new or updated control policy can be downloaded and enforced. According to an exemplary embodiment, the processor 204 can validate control policy A prior to enforcement. Furthermore, the control policy A can be used to validate a location of the mobile computing device and/or whether the mobile computing device is within antenna range of a transmitter so that a new or updated control policy can be downloaded.

According to an exemplary embodiment of the present disclosure, a second exemplary scenario can involve the mobile computing device 200 receiving the control policy over a network via the communications interface 224. In the second scenario the mobile computing device is initially in a powered on state such that the operating system can download the control policy and execute one or more bootloader programs for enforcing the control policy. For example, upon receipt of the control policy, the processor 204 can be configured to execute a boot process wherein a first bootloader can determine which software and hardware components are enabled by the control policy. For the second exemplary scenario, the mobile computing device 200 can be wirelessly connected to the local area network of the building. As a result, after a discovery protocol is executed by the mobile computing device 200 on the network, the control policy can be downloaded from the remote device 170 to the mobile computing device 200 via the communications interface 224. The control policy can be stored in memory 208 and enforced by the processor 204 upon a forced reboot of the mobile computing device 200 by the processor 204. According to another exemplary scenario, remote devices can be distributed throughout the building such that as the mobile computing device passes within antenna range of a distributed remote device a control policy can be wirelessly downloaded to the mobile computing device 200. The processor 204 can enforce the current control policy so long as no new control policy is received over the network. Once a new control policy is received it is stored in memory device 208 and the processor 204 forces a reboot so that the new control policy can be enforced.

Given the above-described scenario, the mobile computing device 200 can include an interface 224, 220 configured to wirelessly receive a control policy from an antenna. The interface can include an RFID component or device or a network interface. The processor 204, 214 can be configured to enforce the received control policy; and memory 208, 212 can be configured to store the received control policy and retain a last-received control policy for enforcement by the processor when the communication interface is outside an antenna range to wirelessly receive any control policy. The processor 204, 212 can be configured to control the memory 208, 212 to overwrite a first control policy stored in the memory when a second control policy is received and stored in the memory. The memory 208, 212 can be configured to retain the second control policy in memory when the device is powered off and the communication interface is outside an antenna range to wirelessly receive any control policy. Each control policy includes instructions for controlling the processor to execute at least a subset of the plurality of operations relative to a location of the mobile computing device.

The mobile computing device 200 can include a power interface (e.g., controller) 218 configured to manage plural power states of the device. The processor 204, 210 can be configured to control the power interface/controller 218 to enter one of the plural power states based on enforcement of a received control policy. The processor 204 can be configured to control the power interface/controller 218 to maintain a current power state when the processor receives and enforces a new control policy.

Figure 4:
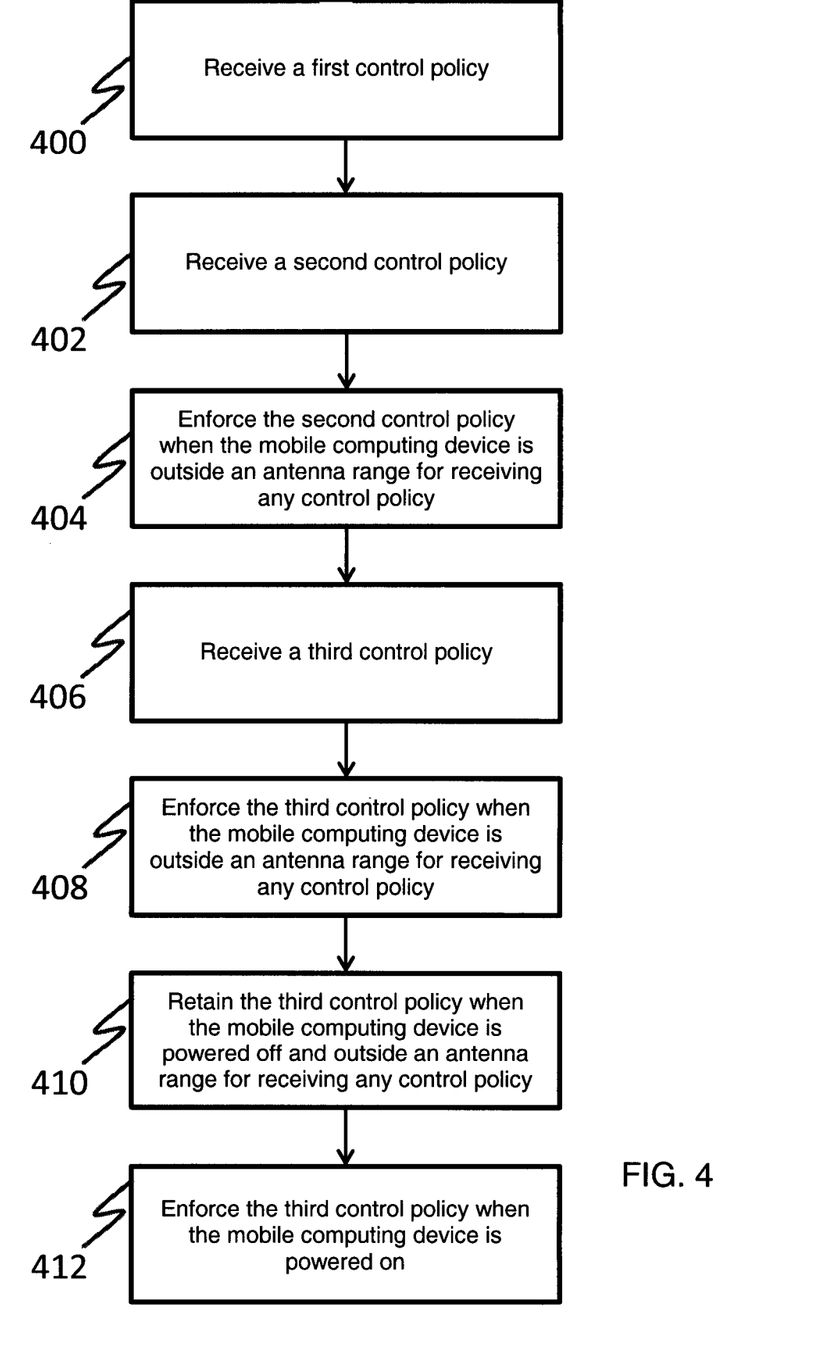
FIG. 4 is a flow chart illustrating exemplary method for retaining a control policy according to an exemplary embodiment.

FIG. 4 illustrates an exemplary method of controlling a mobile computing device having at least a processor 204, 210; memory 208, 212, and an interface 220, 224. In the method, the mobile computing device 200 wirelessly receives when in range of a first antenna, a first control policy for storage in the memory 208, 212 (Step 400). The first control policy disables a power on operation of the mobile computing device 200. When in range of a second antenna, the mobile computing device 200, wirelessly receives a second control policy for storage in the memory 208, 212 (Step 402). The first control policy stored in the memory is overwritten when the second control policy is received and stored in the memory. The mobile computing device is in a powered on or powered off state when receiving and storing the first and second wireless control policies. The processor 204, 214 enforces the second control policy to control operation of the mobile computing device, when the mobile computing device is in a powered on state and is outside an antenna range for wirelessly receiving any control policy (Step 404). When enforcing the second control policy, the processor(s) 204, 214 powers on the mobile computing device and enables or disables access to: at least one executable application stored in the memory; at least one operating system of the mobile computing device; and a peripheral hardware component with which the mobile computing device is configured to communicate; and/or a peripheral hardware component with which the mobile computing device is configured to communicate. The mobile computing device 200 wirelessly receives when in range of a third antenna, a third control policy for storage in the memory 208, 212 of the mobile computing device 200 (Step 406). The processor(s) 204, 214 enforces the third control policy to control operation of the mobile computing device 200 when the mobile computing device 200 is outside an antenna range for wirelessly receiving any control policy (Step 408). The mobile computing device 200 retains the third control policy in memory 208, 212 when the mobile computing device 200 is powered off and is outside an antenna range for wirelessly receiving any control policy (Step 410). When the mobile computing device is powered on, the processor 204, 214 enforces the third control policy to control operation of the mobile computing device 200 (Step 412). Also, the communication interface 224 or RFID component 210 depending on the configuration will monitor the area to detect signals from in range antennas or transmitters so that a new or updated control policy can be downloaded and enforced. Each control policy includes instructions for controlling the mobile computing device to execute at least a subset of the plurality of operations relative to a location of the mobile computing device. The control policy can also be used to validate a location of the mobile computing device 200 and/or whether the mobile computing device 200 is within antenna range or a transmitter. According to an exemplary embodiment, each new or updated control policy stored in memory can be validated prior to enforcement.

While various exemplary embodiments of the disclosed system and method have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope. As can be seen above, the application providing method and system can be implemented in any number of ways as discussed above, or as will become apparent to those skilled in the art after reading this disclosure. These embodiments, as well as variations and modifications thereof, which will occur to those skilled in the art, are encompassed by the application providing method and system. Hence, the scope of the application providing method and system is limited only by the metes and bounds as articulated in the claims appended hereto.

What is claimed is:

1. A method of controlling a mobile computing device, the method comprising:
receiving wirelessly at the mobile computing device, a first control policy for storage in a memory of the mobile computing device when in range of a first antenna;
receiving wirelessly at the mobile computing device, a second control policy for storage in the memory of the mobile computing device when in range of a second antenna;
enforcing the second control policy to control operation of the mobile computing device, when the mobile computing device is in a powered-on state and is outside an antenna range for wirelessly receiving any control policy;
evaluating the second control policy for validity;
controlling the mobile computing device to enter a powered-off state or a default preconfigured state when the second control policy is determined to be invalid, the mobile computing device is in the powered-on state, and the mobile computing device is outside an antenna range for wirelessly receiving any control policy; and
controlling, upon power-up, the mobile device to return to the powered-off state when the second control policy is determined to be invalid and the mobile computing device is outside an antenna range for wirelessly receiving any control policy.

2. The method according to claim 1, wherein:
the first control policy stored in the memory is overwritten when the second control policy is received and stored in the memory;
the mobile computing device is in a powered off state when receiving and storing the first and second wireless control policies; and
enforcing the second control policy comprises powering on the mobile computing device.

3. The method according to claim 2, comprising:
receiving wirelessly at the mobile computing device, a third control policy for storage in the memory of the mobile computing device when in range of a third antenna;
enforcing the third control policy to control operation of the mobile computing device when the mobile computing device is outside an antenna range for wirelessly receiving any control policy;
retaining the third control policy in memory when the mobile computing device is powered off and the mobile computing device is outside an antenna range for wirelessly receiving any control policy; and
when the mobile computing device is powered on, enforcing the third control policy to control operation of the mobile computing device.

4. The method according to claim 1, wherein the mobile computing device is in a powered on state when receiving and storing the first and second control policies, the method comprising:
receiving wirelessly at the mobile computing device, a third control policy for storage in the memory of the mobile computing device when in range of a third antenna;
enforcing the third control policy to control operation of the mobile computing device when the mobile computing device is within range of the third antenna or outside an antenna range for wirelessly receiving any control policy; and
retaining the third control policy in memory when the mobile computing device is powered off.

5. The method according to claim 1, wherein enforcing the first control policy comprises:
disabling a power on operation of the mobile computing device.

6. The method according to claim 1, wherein upon enforcing the second control policy, controlling the operation of the mobile computing device comprises:
enabling or disabling access to:
at least one executable application stored in the memory;
at least one operating system of the mobile computing device; or
a peripheral hardware component with which the mobile computing device is configured to communicate.

7. The method according to claim 1, comprising:
enforcing, at power up, a last received control policy stored in the memory.

8. The method according to claim 1, comprising:
managing, through a power interface, plural power states of the mobile computing device;
controlling the power interface, via the processor, to enter one of the plural power states based on enforcement of at least one of the first or second control policies; and
controlling the power interface to maintain or modify a current power state when the processor receives and enforces a new control policy.

9. The method according to claim 8, comprising:
controlling the power interface to enter the powered off state or the default pre-configured state when no valid control policy is stored in memory and when the mobile computing device is outside antenna range to wirelessly receive any control policy.

10. The method according to claim 1, wherein upon power-up, the method comprises:
listening for in range transmitters;
downloading an updated control policy, when within antenna range of a transmitter; and
enforcing the updated control policy.

11. The method according to claim 1, comprising:
validating a location of the mobile computing device with at least one of the first control policy or the second control policy.

12. The method according to claim 1, comprising:
validating that the interface is within an antenna range with at least one of the first control policy or the second control policy.

13. The method according to claim 1, wherein the control policy is invalid based on a location for enforcement of the received control policy or when instructions included in the control policy are determined to be expired, corrupted, or malicious.

14. The method according to claim 1, comprising:
enforcing, upon power-up, the second control policy to control operation of the mobile computing device, when the second control policy is determined to be valid and the mobile computing device is outside an antenna range for wirelessly receiving any control policy.

15. A mobile computing device, comprising:
an interface configured to wirelessly receive a control policy from an antenna;
a processor configured to evaluate and enforce the received control policy; and
memory configured to store the received control policy and retain an earlier received control policy for enforcement by the processor when the interface is outside an antenna range to wirelessly receive any control policy,
wherein the processor is further configured to control the mobile computing device to:
enter a powered off state or a default pre-configured state when the earlier received control policy is determined to be invalid, the mobile computing device is in the powered on state, and the interface is outside an antenna range to wirelessly receive any control policy, and
upon power up, return to the powered off state when the second control policy is determined to be invalid and the interface is outside any antenna range to wirelessly receive any control policy.

16. The device according to claim 15, wherein each control policy includes instructions for controlling the processor to execute at least a subset of the plurality of operations relative to a location of the mobile computing device.

17. The device according to claim 15, wherein:
the interface is an RFID device or a network controller; and
the control policy validates a location of the mobile computing device or that the interface is within range of an antenna.

18. The device according to claim 15, wherein the processor is configured to control the memory to overwrite a first control policy stored in the memory when a second control policy is received and stored in the memory.

19. The device according to claim 15, wherein the memory is configured to retain the second control policy in memory when the device is powered off and the communication interface is outside an antenna range to wirelessly receive any control policy.

20. The device according to claim 15, comprising:
a power interface configured to manage plural power states of the device,
wherein the processor is configured to control the power interface to enter one of the plural power states based on enforcement of a received control policy, and
wherein the processor is configured to control the power interface to maintain or modify a current power state when the processor receives and enforces a new control policy.

21. The device according to claim 15, wherein upon enforcing the control policy the processor is configured to enable or disable access to:
at least one executable application stored in the memory;
at least one operating system of the mobile computing device; or
a peripheral hardware component with which the mobile computing device is configured to communicate,
wherein upon power up, the processor is configured to enforce the last received control policy stored in the memory.

22. The device according to claim 15, wherein upon power-up, the interface listens for in range transmitters for downloading an updated control policy; and when the interface downloads an updated control policy, the processor is configured to enforce the updated control policy.

23. The device according to claim 15, wherein the processor is configured to evaluate the validity of the received control policy based on a location for enforcement of the received control policy or when instructions included in the control policy are determined to be expired, corrupted, or malicious.

24. The device according to claim 15, wherein, upon power-up, the processor is configured enforce the second control policy to control operation of the mobile computing device, when the second control policy is determined to be valid and the interface is outside an antenna range to wirelessly receive any control policy.

* * * * *